(12) United States Patent
Tritschler et al.

(10) Patent No.: US 12,397,661 B2
(45) Date of Patent: Aug. 26, 2025

(54) OMNIDIRECTIONAL ACCESS

(71) Applicant: PULS GmbH, Munich (DE)

(72) Inventors: Johannes Tritschler, Hartheim (DE); Carina Kreutner, Freiburg (DE)

(73) Assignee: PULS GmbH, Freiburg im Breisgau (DE)

( * ) Notice: Subject to any disclaimer, the term of this patent is extended or adjusted under 35 U.S.C. 154(b) by 48 days.

(21) Appl. No.: 18/562,824

(22) PCT Filed: May 19, 2022

(86) PCT No.: PCT/EP2022/063596
§ 371 (c)(1),
(2) Date: Nov. 20, 2023

(87) PCT Pub. No.: WO2022/243443
PCT Pub. Date: Nov. 24, 2022

(65) Prior Publication Data
US 2024/0227586 A1    Jul. 11, 2024

(30) Foreign Application Priority Data
May 21, 2021  (EP) .................................... 21175237

(51) Int. Cl.
*B60L 53/12*  (2019.01)
*H02J 50/00*  (2016.01)
(Continued)

(52) U.S. Cl.
CPC ............ *B60L 53/12* (2019.02); *H02J 50/005* (2020.01); *H02J 50/10* (2016.02); *H02J 50/90* (2016.02)

(58) Field of Classification Search
CPC ........ B60L 53/12; B60L 53/305; B60L 53/38; H02J 50/005; H02J 50/10; H02J 50/90;
(Continued)

(56) References Cited

U.S. PATENT DOCUMENTS 9,631,950 B2 * 4/2017 Raedy ..................... H02J 50/90
9,739,844 B2   8/2017 Widmer et al.
(Continued)

FOREIGN PATENT DOCUMENTS

| CN | 205 921 464 U | 2/2017 |
| EP | 3 364 522 A1  | 8/2018 |
| JP | 2018-161002 A | 10/2018 |

OTHER PUBLICATIONS

International Search Report and Written Opinion dated Aug. 31, 2022, in connection with International Application No. PCT/EP2022/063596.

(Continued)

*Primary Examiner* — Lincoln D Donovan
*Assistant Examiner* — Alex W Lam
(74) *Attorney, Agent, or Firm* — Wolf, Greenfield & Sacks, P.C.

(57) ABSTRACT

Coil pad for wireless power transfer having a front plane radiating an electromagnetic field during wireless power transfer, the coil pad having a circumference encompassing a positioning contour reflecting positioning options for at least one point-to-point communication element to be embedded into the front plane, the positioning contour having rotational symmetry with respect to a first axis of symmetry and a second axis of symmetry orthogonal to the first axis of symmetry, the first axis of symmetry and the second axis of symmetry intersecting at an origin and defining a coordinate system for the front plane, and the coil pad comprising a point-to-point communication element embedded into the front plane at an intersection of the positioning contour and a positioning hand extending from the origin along a first direction defined by a first angle of rotation in clockwise direction relative to the first axis of symmetry.

13 Claims, 10 Drawing Sheets

(51) Int. Cl.
*H02J 50/10* (2016.01)
*H02J 50/90* (2016.01)

(58) Field of Classification Search
CPC .. H02J 50/80; H02J 50/12; H02J 50/70; H02J 50/50; H02J 50/60; H02J 50/402; Y02T 10/70; Y02T 10/7072; Y02T 90/14
See application file for complete search history.

(56) References Cited

U.S. PATENT DOCUMENTS

| | | |
|---|---|---|
| 2016/0290832 A1 | 10/2016 | Raedy et al. |
| 2016/0380487 A1* | 12/2016 | Widmer ................. B60L 53/39 324/654 |
| 2017/0111088 A1* | 4/2017 | Seong ...................... H04B 5/79 |
| 2017/0264143 A1* | 9/2017 | Lee ......................... H01F 38/14 |
| 2017/0361724 A1* | 12/2017 | Seong ..................... B60L 53/38 |
| 2020/0136438 A1 | 4/2020 | Seong |

OTHER PUBLICATIONS

International Preliminary Report on Patentability dated Apr. 28, 2023, in connection with International Application No. PCT/EP2022/063596.

* cited by examiner

OMNIDIRECTIONAL ACCESS

CROSS REFERENCE TO RELATED APPLICATIONS

This Application is a national stage filing under 35 U.S.C. § 371 of International Patent Application Serial No. PCT/EP2022/063596, filed May 19, 2022, which claims priority to European application number EP 21 175 237.3, filed May 21, 2021. The contents of these applications are incorporated herein by reference in their entirety.

FIELD OF INVENTION

The present invention relates to coil pads for wireless power transfer having at least one point-to-point communication element embedded into the front plane for position identification and further to an autonomous vehicle having installed therein at least one such a coil pad.

TECHNICAL BACKGROUND

Wireless power transmission systems have huge advantages over cable connected systems. Due to technological advancements wireless power transmission systems for mobile batteries gain more and more attention.

In general, wireless power transmission systems consist of a stationary side and a mobile side. The stationary side has a switched mode electronic circuit and a resonant circuit consisting of capacitors and a transmission coil. At the mobile side, a voltage and current are induced in a receiving coil forming part of a resonant circuit. Here, a passive or active rectifier directly feeds a battery or a mobile energy system which consists of several loads, e.g., a DC/DC-converter, and energy storage devices like batteries, Supercaps, and/or Ultracaps. Also, in order to exchange information between the stationary coil and the mobile coil a communication or sensor-based link is commonly used inside a coil housing.

Figure 1:
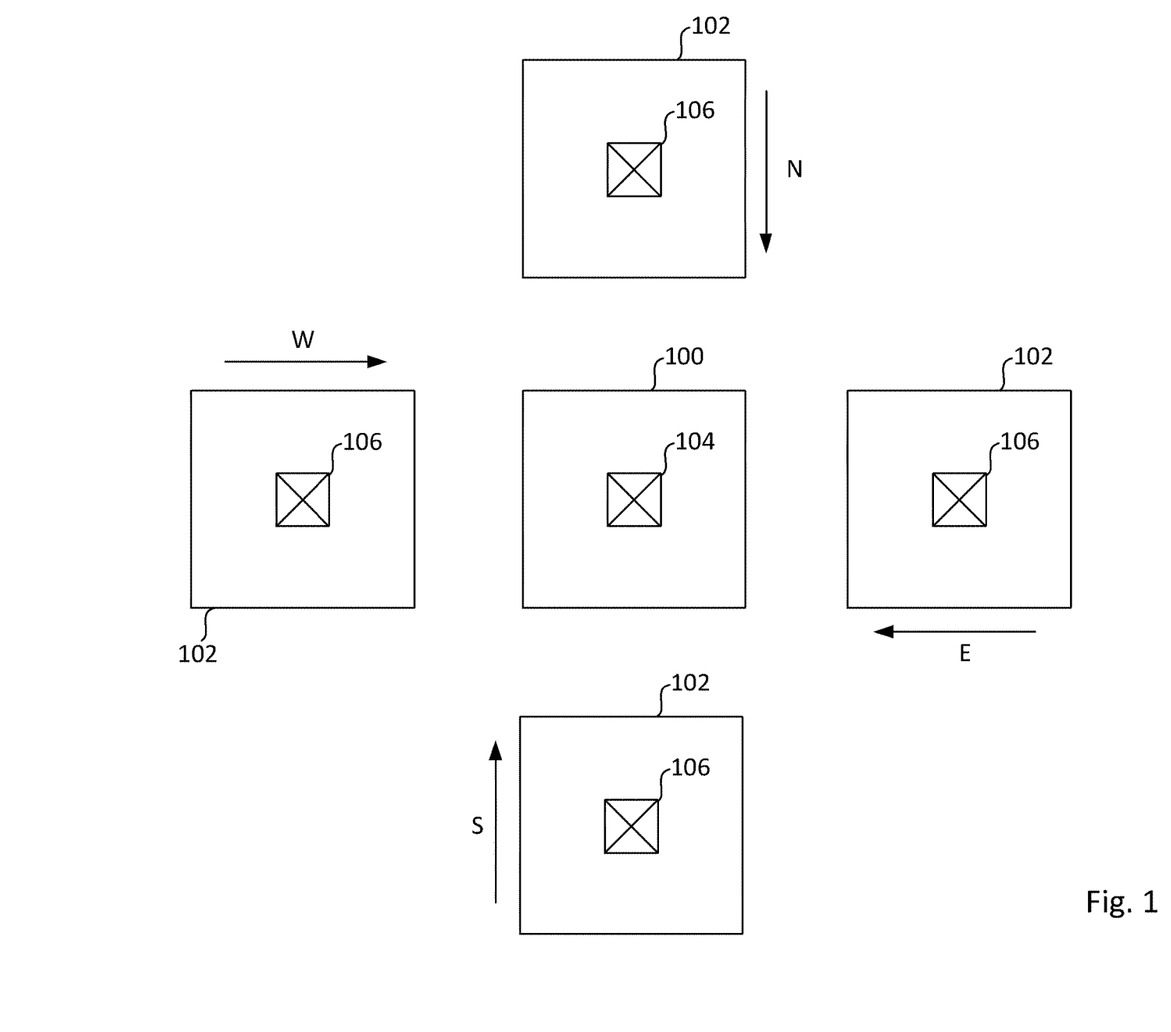
FIG. 1 shows a schematic diagram illustrating an approach to positioning of a mobile coil with respect to a stationary coil as known in the art.

FIG. 1 shows a schematic diagram illustrating an approach to positioning of a mobile coil with respect to a stationary coil as known in the art.

As shown in FIG. 1, a wireless power transmission system must operate independently of the orientation between the stationary coil 100 and the mobile coil 102 relative to each other. This means that a vehicle to be charged can drive over the stationary coil 100 coming from all sides N, E, S, W. For positioning purposes a communication between the stationary coil 100 and the mobile coil 102 is generally used as a locally limited point-to-point communication link established by, e.g., placing NFC or infrared-communication devices 104, 106 at the center of the stationary coil 100 and the mobile coil 102.

A further option for positioning is the use of passive or active sensors inside the coil housing like NFC-tags, positioning sensors, permanent magnets, etc., again placed at the center of the coil housing of the stationary coil 100 and the coil housing of the mobile coil 102.

However, the placement of any electronic or conductive material in the middle of the coils can lead to big problems as there are usually superior magnetic and electric fields in the middle of the stationary coil 100 and the mobile coil 102. Also, central placement is disadvantageous for the mechanical stability of the coils when, e.g., vehicles drive over the stationary coil 100.

Yet another disadvantage of existing positioning systems is that due to the central placement of communication devices 104, 106 at the center of the stationary coil 100 and the mobile coil 102 it is only possible to detect alignment of the stationary coil 100 and the mobile coil 102. However, what is missing is information indicating from which direction the mobile coil 102 approaches the stationary coil 100.

SUMMARY OF INVENTION

In view of the above, an object of the present invention is to provide a more flexible approach to the handling of an omnidirectional access of a mobile coil to a stationary coil.

According to a first aspect of the present invention this object is achieved by a coil pad for wireless power transfer having a back plane and a front plane radiating an electromagnetic field during wireless power transfer. The coil pad has a circumference encompassing an imaginary positioning contour 80 reflecting positioning options for at least one point-to-point communication element to be embedded into the front plane of the coil pad. Further, the imaginary positioning contour 80 has rotational symmetry with respect to a first axis of symmetry 82 and a second axis of symmetry 84 orthogonal to the first axis of symmetry 82, the first axis of symmetry 82 and the second axis of symmetry 84 intersecting at an origin and defining an imaginary coordinate system for the front plane of the coil pad. Finally, the coil pad comprises a first point-to-point communication element embedded into the front plane of the coil pad at a first position being an intersection of the imaginary positioning contour 80 and an imaginary positioning hand extending from the origin of the imaginary coordinate system along a first direction defined by a first angle of rotation $\pi+\alpha$, $0 \leq \alpha \leq \pi/2$ in clockwise direction relative to the first axis of symmetry 82.

According to a second aspect of the present invention the object outlined above is achieved by a coil pad for wireless power transfer having a back plane and a front plane radiating an electromagnetic field during wireless power transfer. The coil pad has a circumference encompassing an imaginary positioning contour 80 reflecting positioning options for at least one point-to-point communication element to be embedded into the front plane of the coil pad. Further, the imaginary positioning contour 80 has rotational symmetry with respect to a first axis of symmetry 82 and a second axis of symmetry 84 orthogonal to the first axis of symmetry 82, the first axis of symmetry 82 and the second axis of symmetry 84 intersecting at an origin and defining an imaginary coordinate system for the front plane of the coil pad. According to the second aspect, the coil pad comprises a third point-to-point communication element embedded into the front plane of the coil pad at a third position being an intersection of the imaginary positioning contour 80 and an imaginary positioning hand extending from the origin of the imaginary coordinate system along a third direction defined by a third angle of rotation $\pi+\beta$, $0 \leq \beta = \pi/2-\alpha$ in clockwise direction relative to the first axis of symmetry 82.

According to a third aspect of the present invention the object outlined above is achieved by a mobile autonomous vehicle comprising an electric drive, an energy storage device for supply of energy to the electric drive, and a mobile side wireless power transmission subsystem using a coil pad according to the first aspect or the second aspect of the present invention.

According to a third aspect of the present invention the object outlined above is achieved by a wireless power transmission system, comprising a stationary side using a coil pad according to the first aspect of the present invention and a mobile side using a coil pad according to the second aspect of the present invention.

BRIEF DESCRIPTION OF DRAWING

In the following preferred embodiments and examples of the present invention will be explained with reference to the drawing in which:

FIG. 2 shows a first example to the detection of an approach of a mobile side coil to a stationary coil along a single direction according to the present invention;

DESCRIPTION OF INVENTION

It should be noted that the explanations given are non-binding and the scope of the present invention is determined by the claims following the description.

Further, the present invention relates to an approach of detecting an access of a mobile side part of a wireless power transfer system to a stationary part of the wireless power transfer system. In more detail, the gist of the present invention is related to a detection of an omni-directional access of a mobile side coil approaching a stationary coil for wireless power transfer. In the following, it will be assumed, without loss of generality, that the mobile side coil and the stationary side coil are realized as coil pads having a front side, a shielded back side, and an accommodating the actual coil therein aside of further circuitry like sensors, communication devices, etc. as outlined above.

Further, it should be noted that omni-directional access according to the present invention is related to different scenarios of a mobile side coil pad approaching a stationary side coil pad. The most simple case to be discussed in the following with respect to FIG. 2 and FIG. 3, the approach is along a single direction. Then, first generalization is to detect an omni-directional access along two orthogonal directions as will be explained with respect to FIG. 4 to FIG. 7.

Then, in the most general case according to the present invention, it is possible to detect an omni-directional access with respect to any direction between a mobile side coil pad and a stationary side coil pad.

Figure 2:
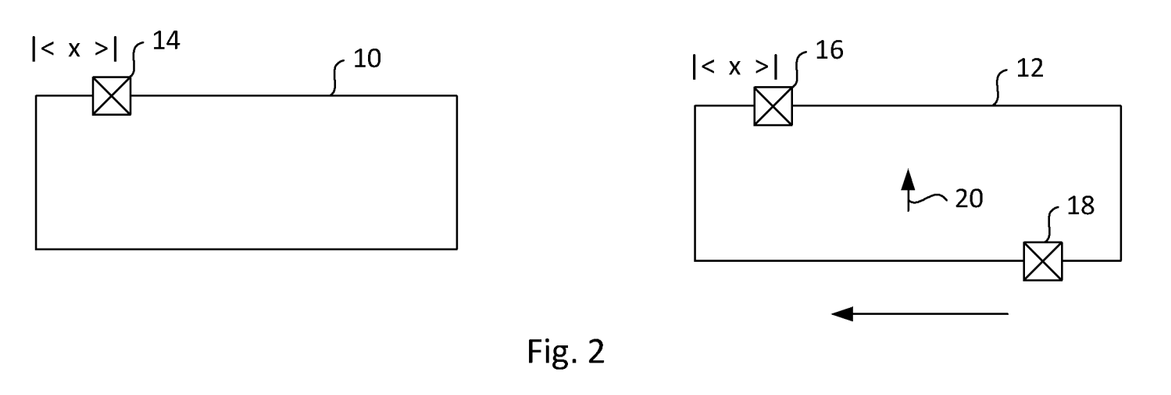
FIG. 2 shows a first example for the detection of an approach of a mobile side coil to a stationary coil along a single direction according to the present invention.

FIG. 2 shows a first example to the detection of an approach of a mobile side coil to a stationary coil along a single direction according to the present invention.

As shown in FIG. 2, without loss of generality, one may assume that the coil pad 10 is a stationary coil pad and that the coil pad 12 is the mobile coil pad. Further, the stationary coil pad has one point-to-point communication element 14 embedded into the prompt plain thereof. Also, the mobile side coil pad has a first point-to-point communication element 16 positioned at the upper left side thereof and a second point-to-point communication element 18 embedded at a lower right side thereof, assuming a first orientation as indicated by the arrow 20.

As shown in FIG. 2, to be operational, one may assume that the point-to-point communication element 14 is shifted by a distance x from the stationary side coil pad 10. Similarly, the first coil pad 16 of the mobile coil pad 12 is shifted by a distance x from the left edge of the mobile coil pad 12, while the second point-to-point communication element of the mobile coil pad 12 is shifted by the same distance x against the right edge of the mobile coil pad 12.

As shown in FIG. 2, operatively, when the mobile coil 12 approaches the stationary coil pad 10 from right to left in westward direction, then eventually the point-to-point communication element 14 of the stationary coil pad 10 and the first point-to-point communication element 16 of the mobile coil pad 12 will be aligned indicating an overlap. Also, as the mobile coil pad 12 has a first point-to-point communication element 16 and a second point-to-point communication element 18, the differentiation between these two communication elements allows to identify the direction along which the mobile coil pad approaches the stationary coil pad, or otherwise the orientation of the mobile coil pad in upwards direction, see arrow 20.

Figure 3:
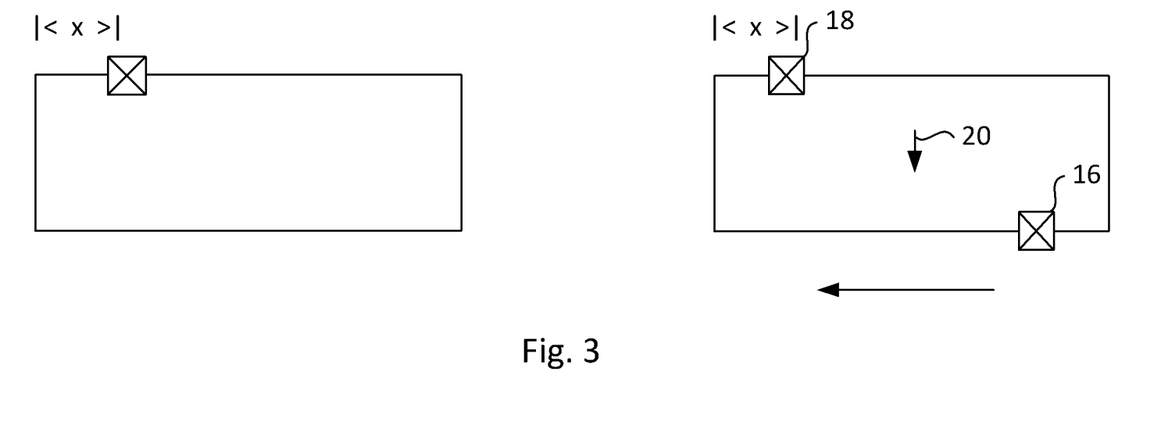
FIG. 3 shows a second example for the detection of an approach of a mobile side coil to a stationary coil along a single detection according to the present invention.

FIG. 3 shows a second example to the detection of an approach of a mobile side coil to a stationary coil along a single detection according to the present invention.

FIG. 3 shows similar elements as shown in FIG. 2 and the same reference numerals are used to identify the related components. To avoid redundancy, repeated explanation thereof is omitted.

As shown in FIG. 3, assuming that the mobile coil pad is flipped by 180 degrees, then the match between the point-to-point communication element 14 of the stationary side coil pad will not be to the first point-to-point communication element 16, but to the second point-to-point communication element 18 of the mobile side coil pad. This allows to conclude on a direction of approach being complementary to the direction of approach explained with respect to FIG. 2.

Figure 4:
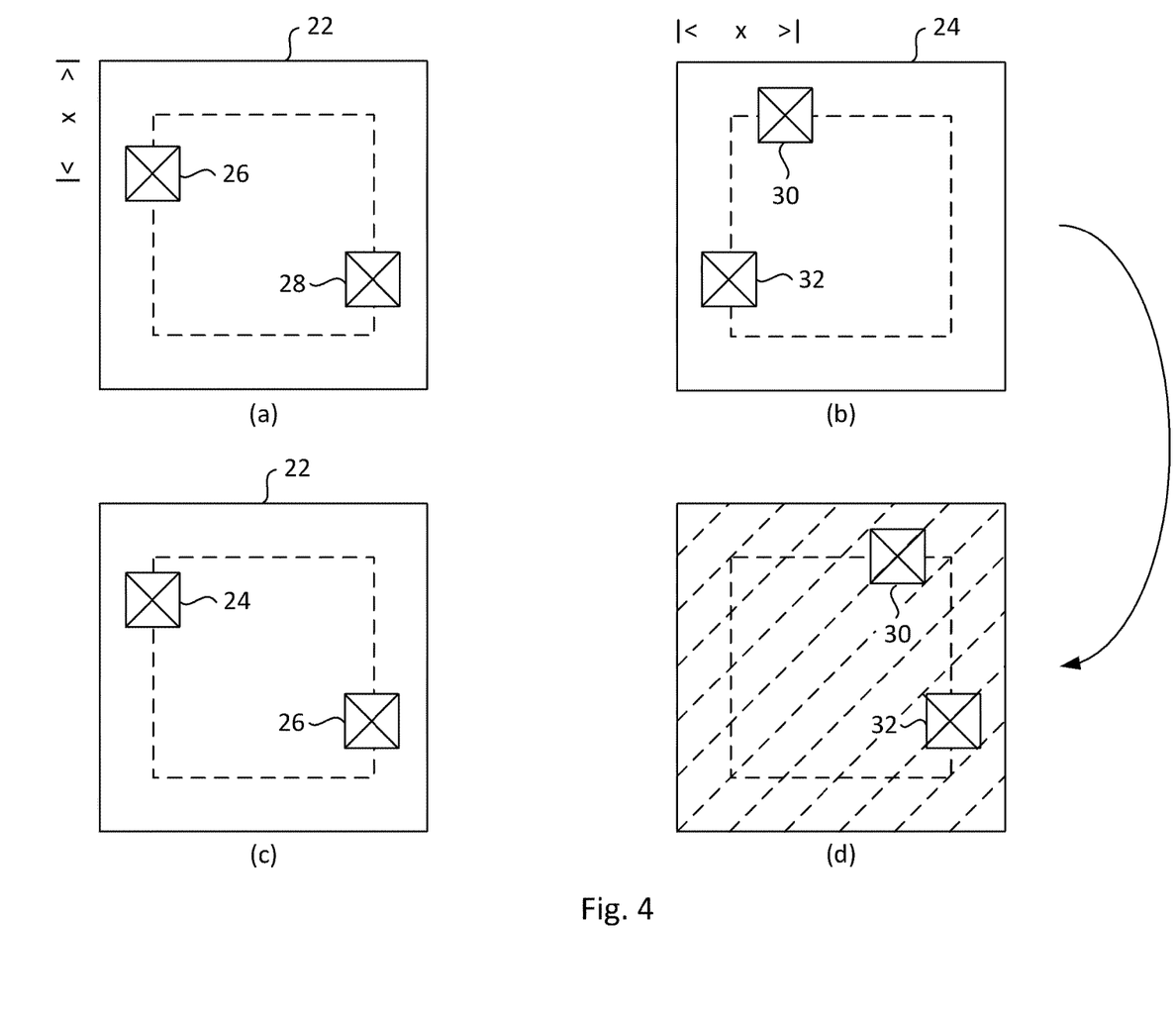
FIG. 4 shows a first concept underlying the detection of an omnidirectional approach of a mobile side coil to a stationary coil along two orthogonal directions according to the present invention.

FIG. 4 shows a first concept underlying the detection of an omnidirectional approach of a mobile coil pad to a stationary coil pad along two orthogonal directions according to the present invention.

As shown in FIG. 4, for the detection of an omnidirectional approach along two orthogonal directions, there is considered a stationary coil pad 22 and a mobile coil pad 24. Without loss of generality, it is assumed that the stationary coil pad 22 and the mobile coil pad 24 have a square circumference.

As shown in FIG. 4(a), the stationary coil pad 22 has a first point-to-point communication element 26 and a second point-to-point communication element 28 shifted against the upper and lower edge of the stationary coil pad by a distance x, respectively. Also, without loss of generality, it is assumed that the first point-to-point communication element 26 and the second point-to-point communication element 28 are placed on a positioning contour shown as shaded line in FIG. 4(a).

As shown in FIG. 4(b), the mobile coil pad 24 has a third point-to-point communication element 30 and a fourth point-to-point communication element 32, respectively. The third point-to-point communication element 30 is shifted by distance x against the left edge of the mobile communication pad 24 and the fourth point-to-point communication element 32 is shifted by the same distance x against the lower edge of the mobile coil pad 24. Both, the third and fourth point-to-point communications are again positioned on a positioning contour shown as dashed line.

As shown in FIG. 4(c) and FIG. 4(d), operatively, at least one of the coil pads 22 and 24 will be flipped by 180 degrees such that the respective point-to-point communication elements face each other. Without loss of generality, it is assumed that the stationary coil pad is as shown in FIG. 4(a) and FIG. 4(c), while the mobile coil pad is flipped from the state shown in FIG. 4(b) into the state shown in FIG. 4(d), illustrated by a shading with dashed line.

Figure 5:
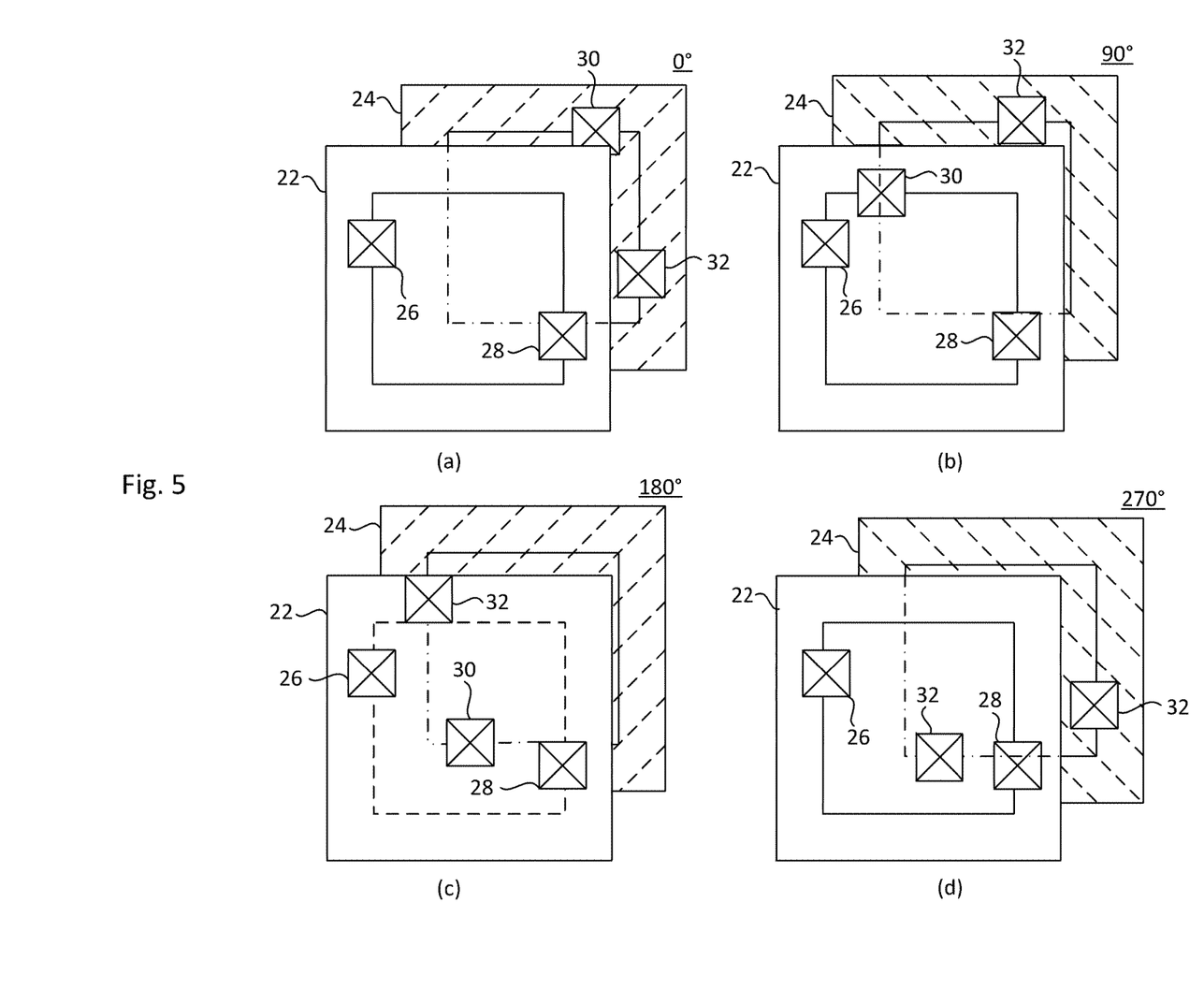
FIG. 5 shows examples for the detection of an omnidirectional approach of a mobile side coil to a stationary coil along two orthogonal directions in line with the first concept underlying the detection of an omnidirectional approach as shown in FIG. 4.

FIG. 5 shows examples for the detection of an omnidirectional approach of a mobile coil pad to a stationary coil pad along two orthogonal directions in line with the first concept underlying the detection of an omnidirectional approach as shown in FIG. 4.

As shown in FIG. 5, there are considered four examples of the relative orientation of the stationary coil pad 22 and the mobile coil pad 24, respectively. More specifically, FIG. 5(a) shows a relative orientation of zero degrees, FIG. 5(b) shows a relative orientation of 90 degrees, FIG. 5(c) shows a relative orientation of 180 degrees, and FIG. 5(d) shows a relative orientation of 270 degrees.

As shown in FIG. 5, for the case shown in FIG. 5(a), upon a relative orientation of zero degrees, the second point-to-point communication element 28 of the stationary coil pad 22 and the fourth point-to-point communication element 32 of the mobile coil pad 24 will be aligned. Otherwise, see FIG. 5(b), upon a relative orientation of 90 degrees, the first point-to-point communication element 26 of the stationary coil pad and the third point-to-point communication element 30 of the mobile coil pad will be aligned. As shown in FIG. 5(c), upon a relative orientation of 180 degrees, the first point-to-point communication element 26 of the stationary coil pad 22 and the fourth point-to-point communication element 32 of the mobile coil pad 24 will be aligned, while in the case of a relative orientation of 270 degrees, the fourth point-to-point communication element 32 of the mobile coil pad 24 and the second point-to-point communication element 28 of the stationary coil pad 22 will match.

Figure 6:
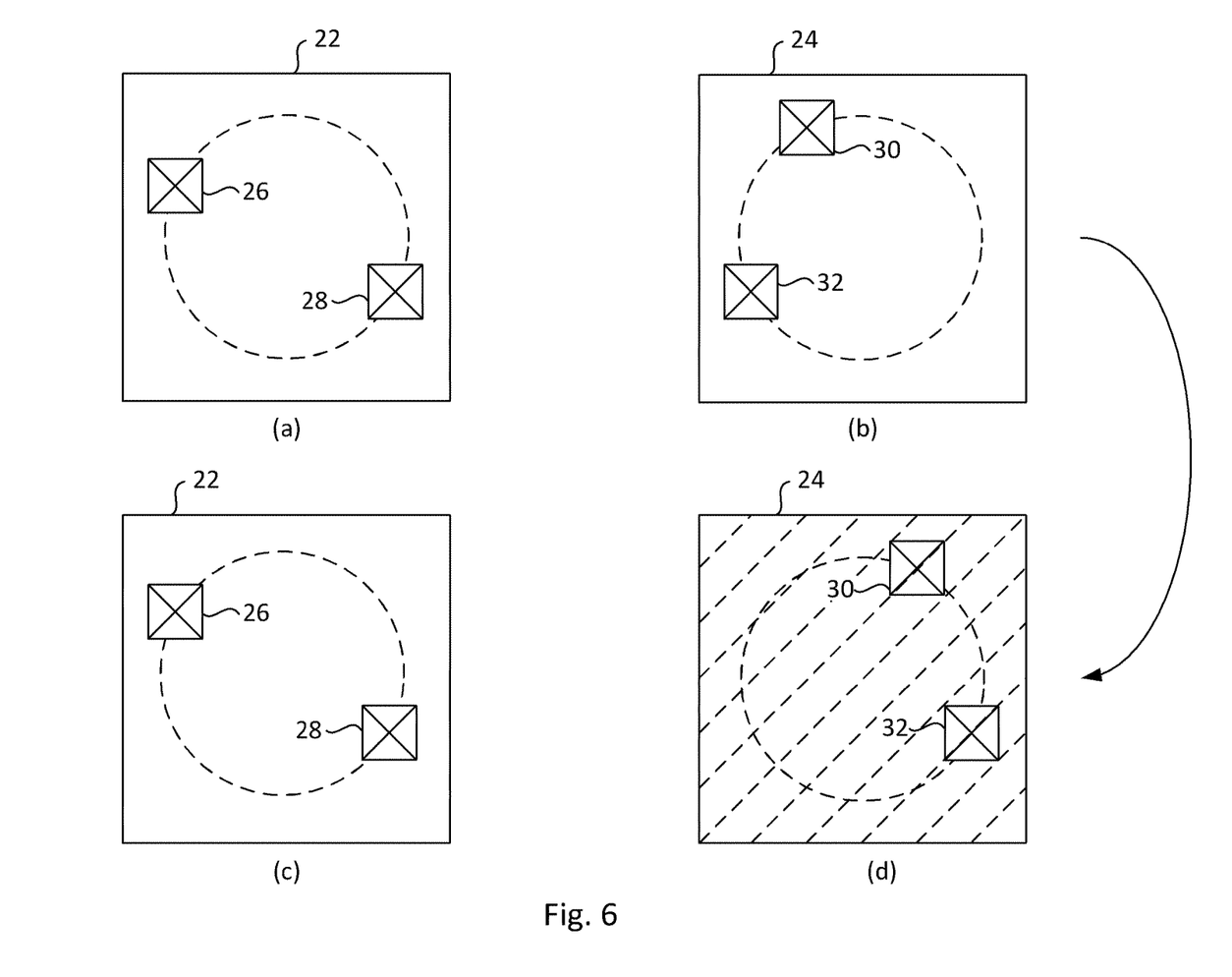
FIG. 6 shows a second concept underlying the detection of an omnidirectional approach of a mobile side coil to a stationary coil along two orthogonal directions according to the present invention.

FIG. 6 shows a second concept underlying the detection of an omnidirectional approach of a mobile coil pad to a stationary coil pad along two orthogonal directions according to the present invention.

The second concept underlying the detection of an omnidirectional approach of a mobile side coil to a stationary side coil pad differs over the first example shown with respect to FIG. 4 and FIG. 5 in that the point-to-point communication element 26 to 32 are arranged on a positioning contour, which is a circle instead of a square. Otherwise, same explanations as given above with respect to FIG. 4 apply also with respect to the stationary coil pad and mobile coil pad as shown in FIG. 6, i.e. the upper part FIG. 6(a) and FIG. 6(b) show the stationary coil pad 23 and the mobile coil pad 24 in front view, while the lower part FIG. 6(c) and FIG. 6(d) show the stationary coil pad 23 in front view and the mobile coil pad 24 being flipped by 180 degrees so as to reflect operational condition.

Figure 7:
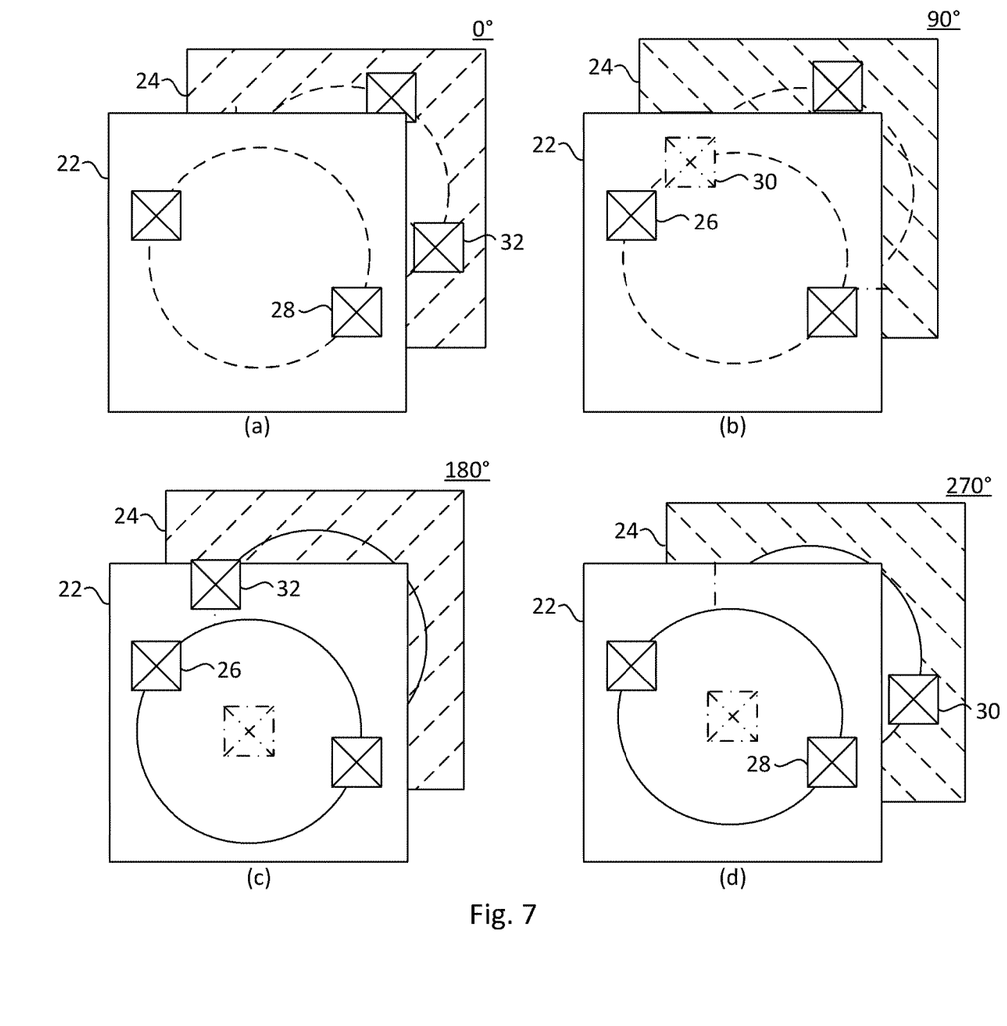
FIG. 7 shows examples for the detection of an omnidirectional approach of a mobile side coil to a stationary coil along two orthogonal directions according to the second concept underlying the detection of an omnidirectional approach as shown in FIG. 6.

FIG. 7 shows examples for the detection of an omnidirectional approach of a mobile coil pad to a stationary coil pad along two orthogonal directions according to the second concept underlying the detection of an omnidirectional approach as shown in FIG. 6.

As shown in FIG. 7 with respect to the realization of the stationary coil pad 22 and the mobile coil pad 24 as shown in FIG. 6, also here four directions of access of the mobile coil pad 24 to the stationary coil pad 22 may be detected. As shown in FIG. 7, for relative orientation of zero degrees between the stationary coil pad 22 and the mobile coil pad 24, the second point-to-point communication element 28 and the fourth point-to-point communication element 32 will be aligned. For relative orientation of 90 degrees, there is an alignment of the first point-to-point communication element 26 of the stationary coil pad 22 and the third point-to-point communication element 30 of the mobile coil pad 24. As shown in FIG. 7(c), for relative orientation of 180 degrees, there will be an alignment of the first point-to-point communication element 26 of the stationary coil pad 22 and the fourth point-to-point communication element 32 of the mobile coil pad 24. Finally, as shown in FIG. 7(d), with a relative orientation of 270 degrees, there will be an alignment of the second point-to-point communication element 28 of the stationary coil pad 22 and the third point-to-point communication element 30 of the mobile coil pad 24.

Figure 8:
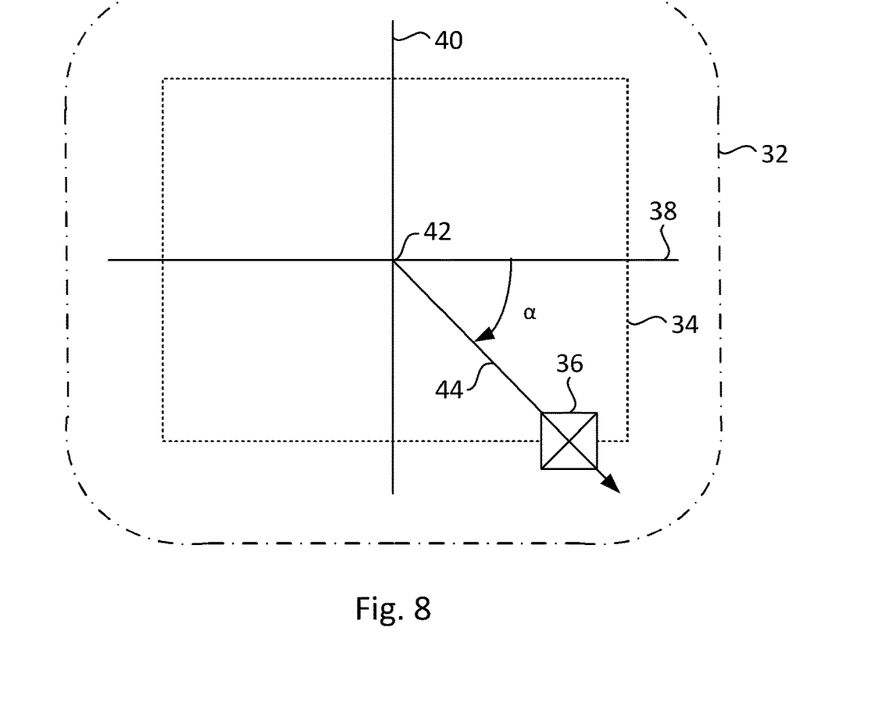
FIG. 8 shows a general framework underlying the embedding of a point-to-point communication element into the front plane of the coil pad according to the present invention.

FIG. 8 shows a general framework underlying the embedding of a point-to-point communication element into the front plane of the coil pad according to the present invention.

As shown in FIG. 8, the coil pad has a circumference 32 encompassing an imaginary positioning contour 80 34 reflecting positioning options for at least one point-to-point communication element to be embedded into the front plane of the coil pad.

As shown in FIG. 8, the imaginary positioning contour 80 34 has rotational symmetry with respect to a first axis of symmetry 82 38 and a second axis of symmetry 84 40 orthogonal to the first axis of symmetry 82 38, the first axis of symmetry 82 38 and the second axis of symmetry 84 40 intersecting at an origin 42 and defining an imaginary coordinate system for the front plane of the coil pad.

As shown in FIG. 8, any position for embedding of a first point-to-point communication element 3 into the front plane of the coil pad may be represented as an intersection of the imaginary positioning contour 80 and an imaginary positioning hand extending from the origin of the imaginary coordinate system along a any direction $0 \leq \alpha \leq 2\pi$ in clockwise direction relative to the first axis of symmetry 82 38.

It should be noted that according to the present invention, the imaginary positioning contour 80 36 and the imaginary positioning hand 44 have no actual realization once the stationary coil pad and the mobile coil pad are realized. They serve only as a concept to illustrate in a most flexible way the options for placement of point-to-point communication elements on the front side of the coil pad. Also, it should be noted that according to the present invention, there is no restriction regarding the form of the circumference and the imaginary positioning contour 80 34. The only restriction in post on the imaginary positioning contour 80 34 is that it has symmetry of order to or as modelled by the first axis of symmetry 82 38 and the second axis of symmetry 84 40 being orthogonal thereto.

Figure 9:
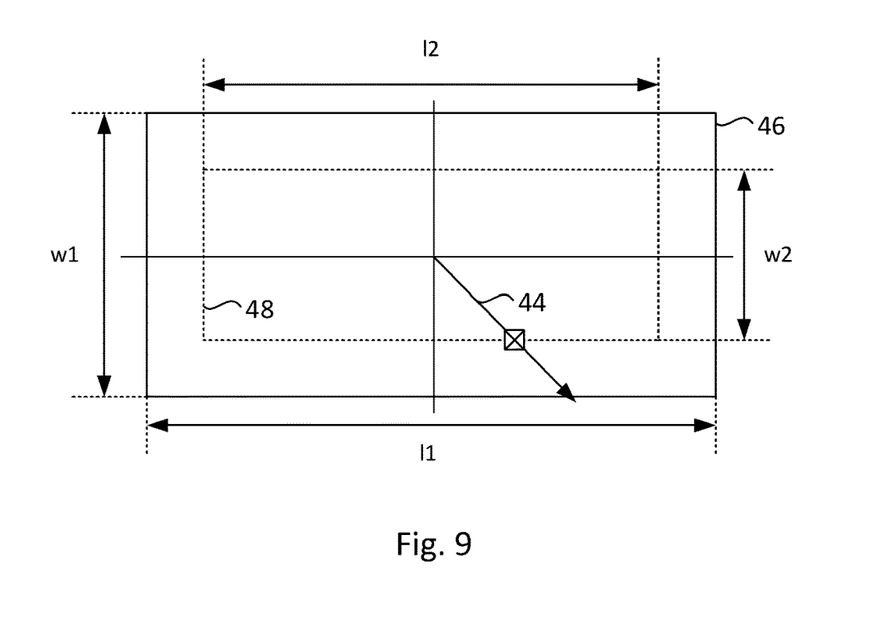
FIG. 9 shows a first example of a coil pad which has a circumference encompassing an imaginary positioning contour 80 reflecting positioning options for at least one point-to-point communication element according to the present invention.

FIG. 9 shows a first example of a coil pad which has a rectangular circumference 46 encompassing a rectangular imaginary positioning contour 80 48 reflecting positioning options for at least one point-to-point communication element according to the present invention.

As shown in FIG. 9, for the first example the rectangular circumference 46 is a first rectangle having a first length l1 and a first width w1, the rectangular imaginary positioning contour 80 48 is a second rectangle having a second length l2<l1 and a second width w2<w1, and the first axis of symmetry 82 and the second axis of symmetry 84 of the second rectangle are respectively coaligned with the related axes of symmetry of the first rectangle.

Figure 10:
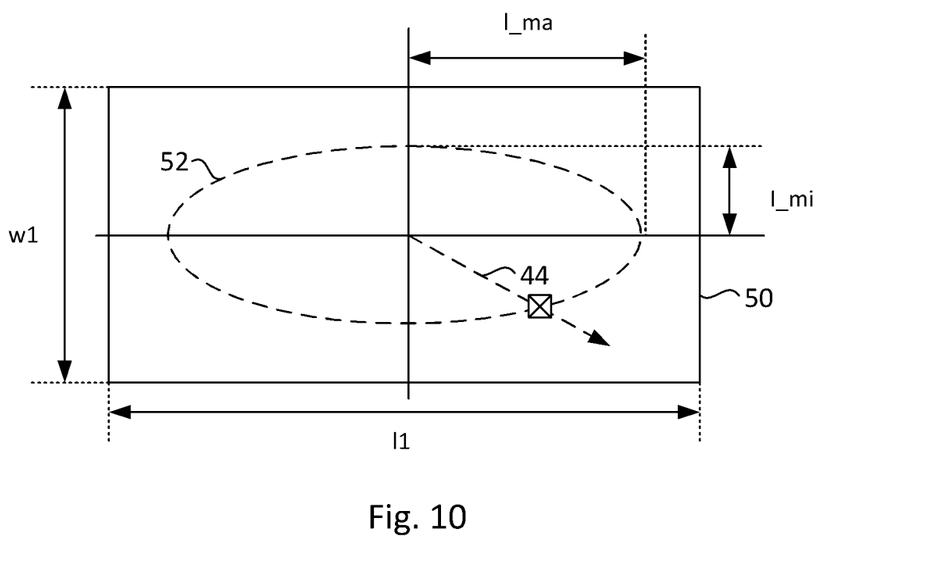
FIG. 10 shows a second example of a coil pad which has a circumference encompassing an imaginary positioning contour 80 reflecting positioning options for at least one point-to-point communication element according to the present invention.

FIG. 10 shows a second example of a coil pad which has a rectangular circumference 50 encompassing an imaginary positioning contour 80 52 reflecting positioning options for at least one point-to-point communication element according to the present invention.

As shown in FIG. 10, for the second example the rectangular circumference 50 is a third rectangle having a third length l3 and a third width w3, the imaginary positioning contour 80 52 is an ellipse having a semi-major axis with length l_ma<l3 and a semi-minor axis with length l_mi<w3, and the first axis of symmetry 82 and the second axis of symmetry 84 of the ellipse are respectively coaligned with the related axes of symmetry of the third rectangle.

Figure 11:
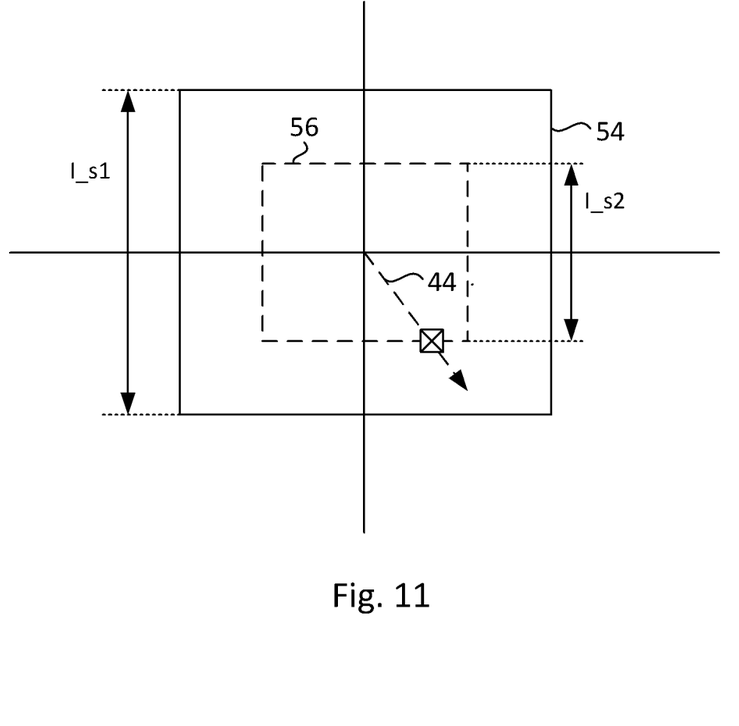
FIG. 11 shows a third example of a coil pad which has a circumference encompassing an imaginary positioning contour 80 reflecting positioning options for at least one point-to-point communication element according to the present invention.

FIG. 11 shows a third example of a coil pad which has a square circumference 54 encompassing a square imaginary positioning contour 80 56 reflecting positioning options for at least one point-to-point communication element according to the present invention.

As shown in FIG. 11, for the third example the square circumference 54 is a first square having a first side length l_s1, the square imaginary positioning contour 80 56 is a second square having a second side length l_s2<l_s1, and the first axis of symmetry 82 and the second axis of symmetry 84 of the second square are respectively coaligned with the related axes of symmetry of the first square.

Figure 12:
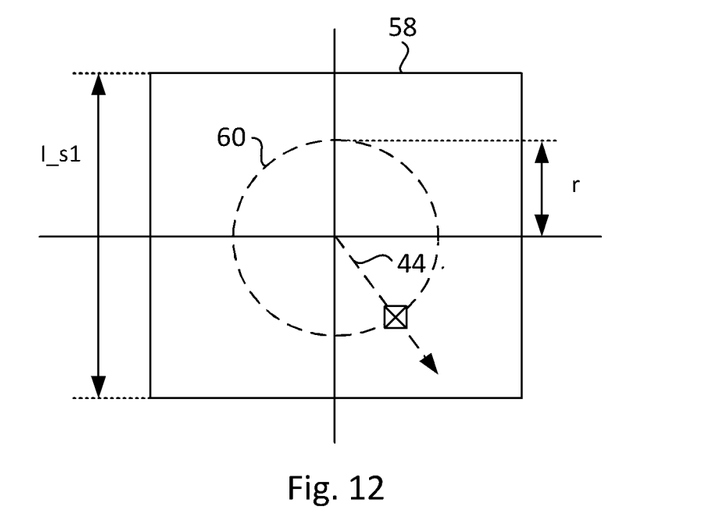
FIG. 12 shows a fourth example of a coil pad which has a circumference encompassing an imaginary positioning contour 80 reflecting positioning options for at least one point-to-point communication element according to the present invention.

FIG. 12 shows a fourth example of a coil pad which has a square circumference 58 encompassing an imaginary positioning contour 80 60 reflecting positioning options for at least one point-to-point communication element according to the present invention.

As shown in FIG. 12, for the fourth example the square circumference 58 is a third square having a third side length l_s3, the imaginary positioning contour 80 60 is a first circle having a radius r_1 smaller than the third side length r_1<l_s3, and the center point of the circle is aligned with the point of intersection of the first axis of symmetry 82 and the second axis of symmetry 84.

Figure 13:
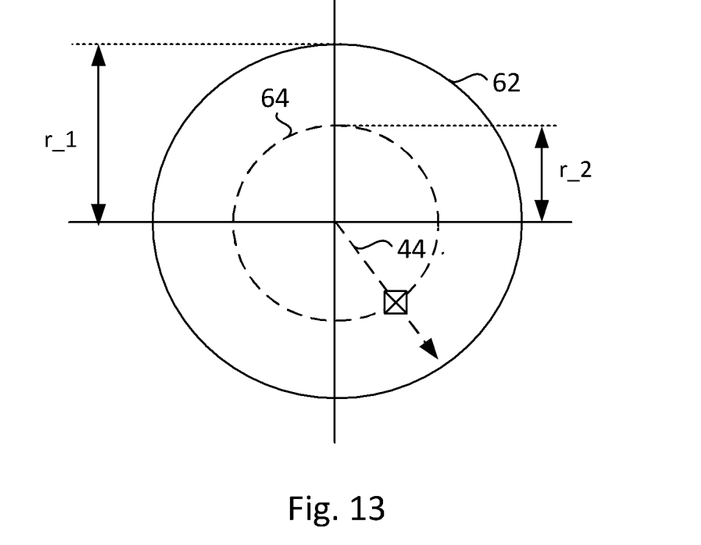
FIG. 13 shows a fifth example of a coil pad which has a circumference encompassing an imaginary positioning contour 80 reflecting positioning options for at least one point-to-point communication element according to the present invention.

FIG. 13 shows a fifth example of a coil pad which has a circumference 62 encompassing an imaginary positioning contour 80 64 reflecting positioning options for at least one point-to-point communication element according to the present invention.

As shown in FIG. 13, for the fourth example the circumference 62 is a second circle having a second r_2, the imaginary positioning contour 80 64 is a third circle having a third radius r_3 smaller than the second radius r_2, and the center points of the second circle and the third circle are aligned with the point of intersection of the first axis of symmetry 82 and the second axis of symmetry 84.

Figure 14:
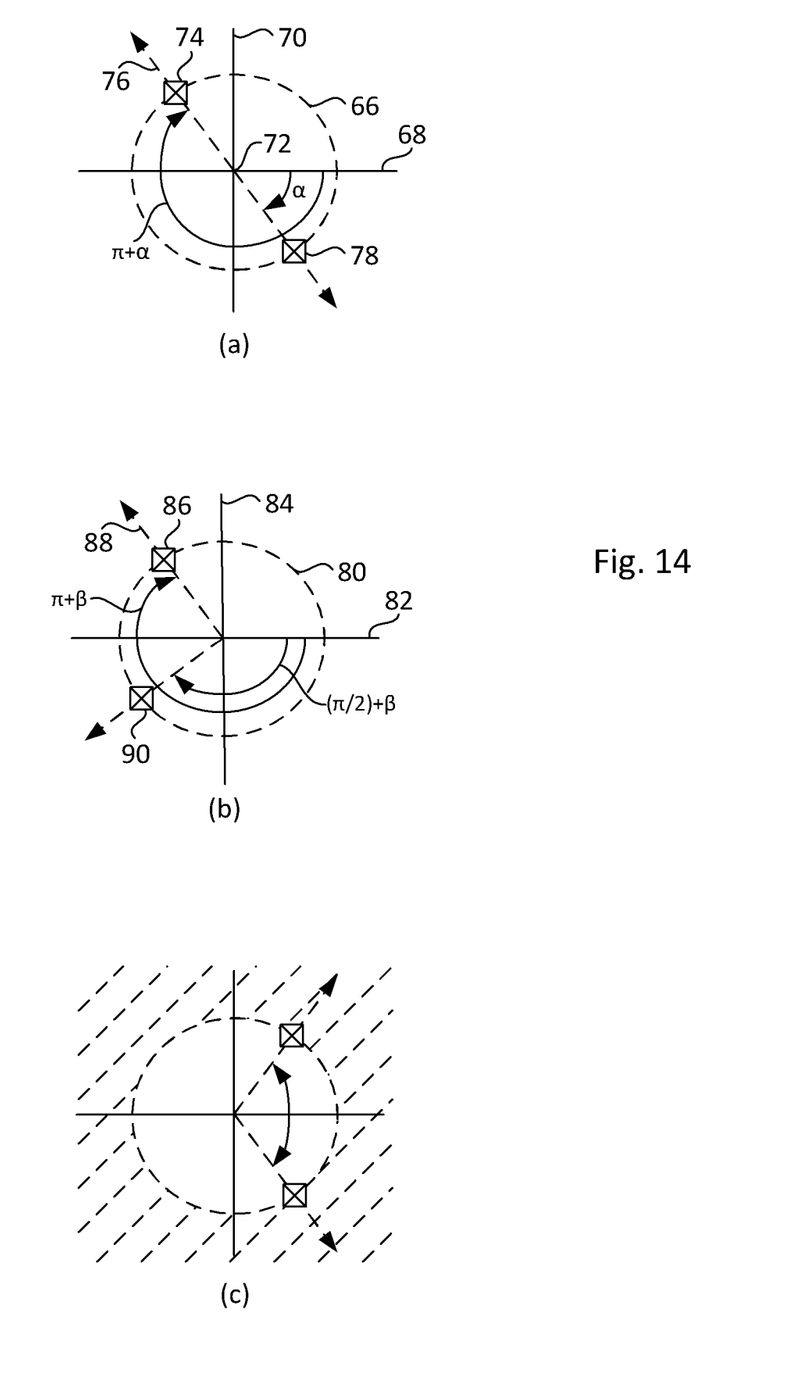
FIG. 14 shows a further concept underlying the detection of an omnidirectional approach of a mobile side coil to a stationary coil along freely configurable directions according to the present invention.

FIG. 14 shows a further concept underlying the detection of an omnidirectional approach of a mobile coil pad to a stationary coil pad along freely configurable directions according to the present invention.

As shown in FIG. 14 (a), in the most general case the coil pad has a circumference encompassing an imaginary positioning contour 80 reflecting positioning options for at least one point-to-point communication element to be embedded into the front plane of the coil pad, e.g., a circle 66.

Further, the imaginary positioning contour 80 has rotational symmetry with respect to a first axis of symmetry 82 and a second axis of symmetry 84 orthogonal to the first axis of symmetry 82, the first axis of symmetry 82 and the second axis of symmetry 84 intersecting at an origin and defining an imaginary coordinate system for the front plane of the coil pad.

Further, the coil pad comprises a first point-to-point communication element embedded 74 into the front plane of the coil pad at a first position being an intersection of the imaginary positioning contour 80 66 and an imaginary positioning hand 76 extending from the origin of the imaginary coordinate system along a first direction defined by a first angle of rotation $\pi+\alpha$, $0 \leq \alpha \leq \pi/2$ in clockwise direction relative to the first axis of symmetry 82 68.

As shown in FIG. 14(a), the coil pad comprises a second point-to-point communication element 78 embedded into the front plane of coil pad at a second position, wherein the second position is an intersection of the imaginary positioning contour 80 66 and the imaginary positioning hand 76 when the imaginary positioning hand 76 extends from the origin along a second direction defined by a second angle of rotation $\alpha$, $0 \leq \alpha \leq \pi/2$ in clockwise direction relative to the first axis of symmetry 82.

Further, in the most general case the coil pad shown in FIG. 14(a) has a counter-part coil pad as shown in FIG. 14(b).

As shown in FIG. 14(b), the coil pad has a circumference encompassing an imaginary positioning contour 80 80 reflecting positioning options for at least one point-to-point communication element to be embedded into the front plane of the coil pad.

As shown in FIG. 14(b), the imaginary positioning contour 80 has rotational symmetry with respect to a first axis of symmetry 82 and a second axis of symmetry 84 orthogonal to the first axis of symmetry 82, the first axis of symmetry 82 and the second axis of symmetry 84 intersecting at an origin and defining an imaginary coordinate system for the front plane of the coil pad.

As shown in FIG. 14(*b*), the coil pad comprises a third point-to-point communication element embedded into the front plane of the coil pad at a third position being an intersection of the imaginary positioning contour 80 and an imaginary positioning hand extending from the origin of the imaginary coordinate system along a third direction defined by a third angle of rotation $\pi+\beta$, $0 \le \beta \le \pi/2$, $\beta = \pi/2 - \alpha$ in clockwise direction relative to the first axis of symmetry 82.

As shown in FIG. 14(*b*), the coil pad comprises a fourth point-to-point communication element embedded into the front plane of coil pad at a fourth position, wherein the fourth position is an intersection of the imaginary positioning contour 80 and the imaginary positioning hand 88 when the imaginary positioning hand extends from the origin along a fourth direction defined by a fourth angle of rotation $(\pi/2)+\beta$, $0 \le \beta \le \pi/2$ in clockwise direction relative to the first axis of symmetry 82.

FIG. 14 (*c*) shows the coil pad shown in FIG. 14 (*b*) once it is flipped to face the coil pad shown in FIG. 14 (*a*).

As shown in FIG. 14 (*c*), assuming that point-to-point communication elements 76, 78 and 88, 90 should match then the coil pad shown in FIG. 14 (*a*) should be rotated by an angle of $\delta$ such that $\beta = \alpha + \delta$.

Thus, according to the present invention within the constellation shown In FIG. 14(*a*) to FIG. 14(*c*) any approach direction of α of the coil pad shown in FIG. 14 (*b*) relative to the coil pad shown in FIG. 14 (*a*) becomes detectable.

Also, from the explanations given with respect to FIG. 14 for $\alpha \ne \beta$ it follows the previously explained constellation according respect to FIG. 4 to 7 are related to special cases $\alpha = \beta$, $\delta = 0$.

Further to the above, it should be noted that the present invention also covers a mobile autonomous vehicle comprising an electric drive, an energy storage device for supply of energy to the electric drive, and a mobile side wireless power transmission subsystem using a coil pad according to the present invention. Preferably, the coil pad of the mobile side wireless power transmission subsystem is provided according to FIG. 12 of FIG. 13 and is attached to the mobile autonomous vehicle.

Further to the above, it should also be noted that the present invention covers a wireless power transmission system, comprising a stationary side using a coil pad according to FIG. 14 (*a*) and a mobile side using a coil pad according to FIG. 14 (*b*, *c*) or vice versa.

The invention claimed is:

1. Coil pad for wireless power transfer having a back plane and a front plane radiating an electromagnetic field during wireless power transfer, wherein:
   the coil pad has a circumference encompassing an imaginary positioning contour reflecting positioning options for at least one point-to-point communication element to be embedded into the front plane of the coil pad,
   the imaginary positioning contour has rotational symmetry with respect to a first axis of symmetry and a second axis of symmetry orthogonal to the first axis of symmetry, the first axis of symmetry and the second axis of symmetry intersecting at an origin and defining an imaginary coordinate system for the front plane of the coil pad, and
   the coil pad comprises a first point-to-point communication element embedded into the front plane of the coil pad at a first position being an intersection of the imaginary positioning contour and an imaginary positioning hand extending from the origin of the imaginary coordinate system along a first direction defined by a first angle of rotation $\pi+\alpha$, $0 \le \alpha \le \pi/2$ in clockwise direction relative to the first axis of symmetry.

2. Coil pad according to claim 1, wherein
   the coil pad comprises a second point-to-point communication element embedded into the front plane of coil pad at a second position, wherein the second position is an intersection of the imaginary positioning contour and the imaginary positioning hand when the imaginary positioning hand extends from the origin along a second direction defined by a second angle of rotation $\alpha$, $0 \le \alpha \le \pi/2$ in clockwise direction relative to the first axis of symmetry.

3. Coil pad for wireless power transfer having a back plane and a front plane radiating an electromagnetic field during wireless power transfer, wherein:
   the coil pad has a circumference encompassing an imaginary positioning contour reflecting positioning options for at least one point-to-point communication element to be embedded into the front plane of the coil pad,
   the imaginary positioning contour has rotational symmetry with respect to a first axis of symmetry and a second axis of symmetry orthogonal to the first axis of symmetry, the first axis of symmetry and the second axis of symmetry intersecting at an origin and defining an imaginary coordinate system for the front plane of the coil pad, and
   the coil pad comprises a third point-to-point communication element embedded into the front plane of the coil pad at a third position being an intersection of the imaginary positioning contour and an imaginary positioning hand extending from the origin of the imaginary coordinate system along a third direction defined by a third angle of rotation $\pi+\beta$, $\beta = \pi/2 - \alpha$ in clockwise direction relative to the first axis of symmetry.

4. Coil pad according to claim 3, wherein
   the coil pad comprises a fourth point-to-point communication element embedded into the front plane of coil pad at a fourth position, wherein the fourth position is an intersection of the imaginary positioning contour and the imaginary positioning hand when the imaginary positioning hand extends from the origin along a fourth direction defined by a fourth angle of rotation $(\pi/2)+\beta$, $\beta = \pi/2 - \alpha$ in clockwise direction relative to the first axis of symmetry.

5. Coil pad according to claim 1, wherein the circumference is a first rectangle having a first length l1 and a first width w1, the imaginary positioning contour is a second rectangle having a second length l2<l1 and a second width w2<w1, and the first axis of symmetry and the second axis of symmetry of the second rectangle are respectively coaligned with the related axes of symmetry of the first rectangle.

6. Coil pad according to claim 1, wherein the circumference is a third rectangle having a third length l3 and a third width w3, the imaginary positioning contour is an ellipse having a semi-major axis with length l_ma<l3 and a semi-minor axis with length l_mi<w3, and the first axis of symmetry and the second axis of symmetry of the ellipse are respectively coaligned with the related axes of symmetry of the third rectangle.

7. Coil pad according to claim 1, wherein the circumference is a first square having a first side length l_s1, the imaginary positioning contour is a second square having a second side length l_s2<l_s1, and the first axis of symmetry and the second axis of symmetry of the second square are respectively coaligned with the related axes of symmetry of the first square.

8. Coil pad according to claim 1, wherein the circumference is a third square having a third side length l_s3, the imaginary positioning contour is a first circle having a radius r_1 smaller than the third side length r_1<l_s3, and the center point of the circle is aligned with the point of intersection of the first axis of symmetry and the second axis of symmetry.

9. Coil pad according to claim 1, wherein the circumference is a second circle having a second r_2, the imaginary positioning contour is a third circle having a third radius r_3 smaller than the second radius r_2, and the center points of the second circle and the third circle are aligned with the point of intersection of the first axis of symmetry and the second axis of symmetry.

10. Coil pad according to claim 1, wherein $\alpha = \beta$.

11. Coil pad according to according to claim 1, wherein $\alpha \neq \beta$.

12. Coil pad according to claim 1, wherein one or more of the first to fourth point-to-point communication element are selected from a group comprising an IR element, a RFID element, and a NFC element.

13. Mobile autonomous vehicle comprising an electric drive, an energy storage device for supply of energy to the electric drive, and a mobile side wireless power transmission subsystem using a coil pad according to claim 1.

* * * * *